No. 807,938. PATENTED DEC. 19, 1905.
H. D. JAMES.
CONTROL SYSTEM FOR ELECTRIC MOTORS.
APPLICATION FILED APR. 3, 1905.

2 SHEETS—SHEET 1.

WITNESSES:
C. L. Belcher
R. J. Dearborn

INVENTOR
Henry D. James
BY
Wesley G. Carr
ATTORNEY

No. 807,938. PATENTED DEC. 19, 1905.
H. D. JAMES.
CONTROL SYSTEM FOR ELECTRIC MOTORS.
APPLICATION FILED APR. 3, 1905.

2 SHEETS—SHEET 2.

WITNESSES:
Fred. H. Miller
R. J. Dearborn

INVENTOR
Henry D. James
BY
Wesley G. Carr
ATTORNEY

UNITED STATES PATENT OFFICE.

HENRY D. JAMES, OF PITTSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM FOR ELECTRIC MOTORS.

No. 807,938.      Specification of Letters Patent.      Patented Dec. 19, 1905.

Application filed April 3, 1905. Serial No. 253,636.

*To all whom it may concern:*

Be it known that I, HENRY D. JAMES, a citizen of the United States, and a resident of Pittsburg, in the county of Allegheny and State of Pennsylvania, have invented a new and useful Improvement in Control Systems for Electric Motors, of which the following is a specification.

My invention relates to systems of electric-motor control, and particularly to such systems as are employed in connection with motors which require large starting-currents.

The object of my invention is to provide a system which shall insure protection against overloads for motors under running conditions and which shall be independent of currents supplied to them under starting conditions.

Currents which must be applied in order to start certain kinds of electric motors under full-load conditions are often sufficiently heavy to injure the motors if continuously applied, and consequently protective devices which are adapted to starting-currents are generally of little value as protection against overloads during normal operation.

According to my invention the circuit that is employed for carrying the starting-currents to the motor is distinct from the path provided for the currents that are employed for normally operating the machine, so that it may be independently protected to suit the respective conditions.

My invention is illustrated in the accompanying drawings, in which—

Figure 1:
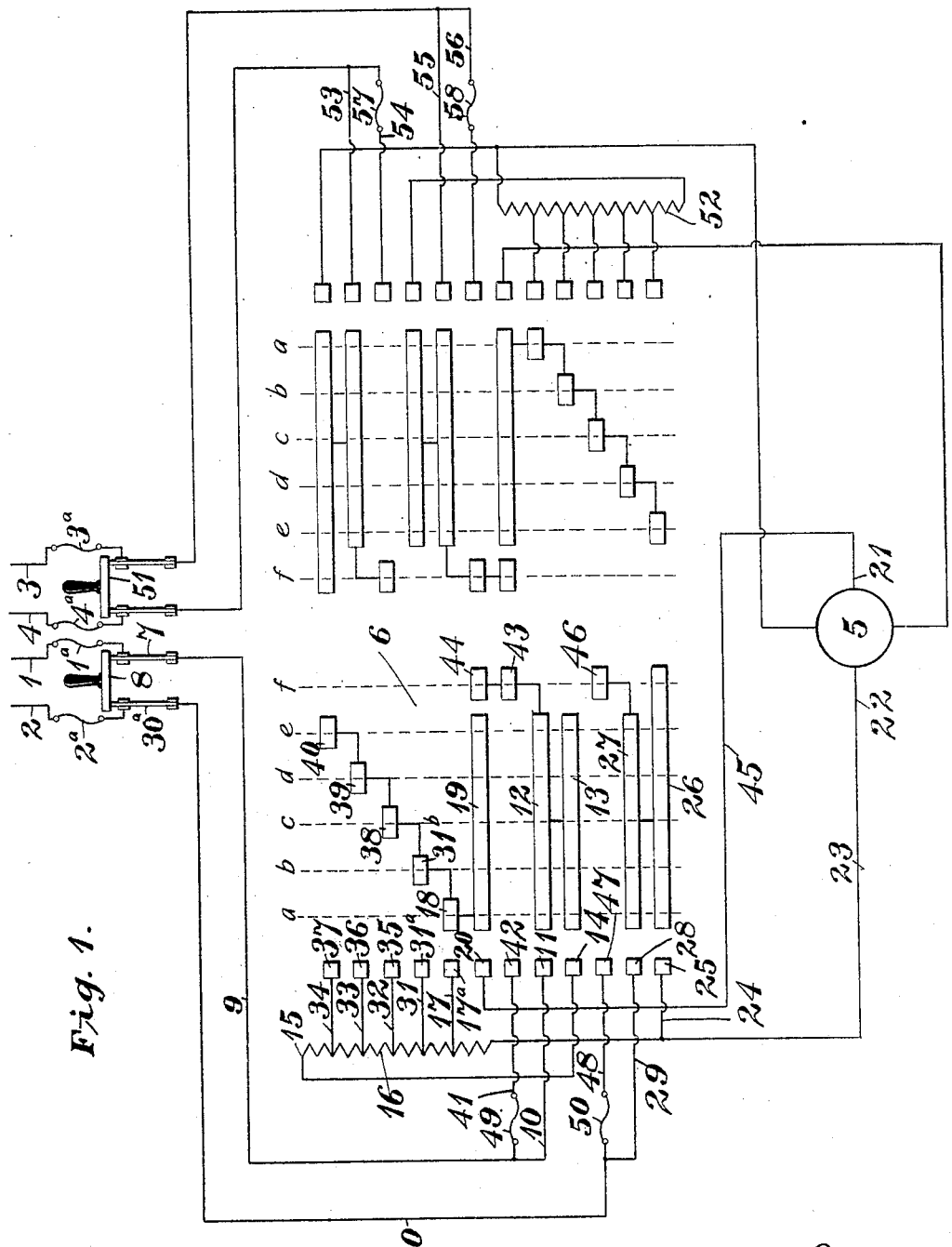
Figure 2:
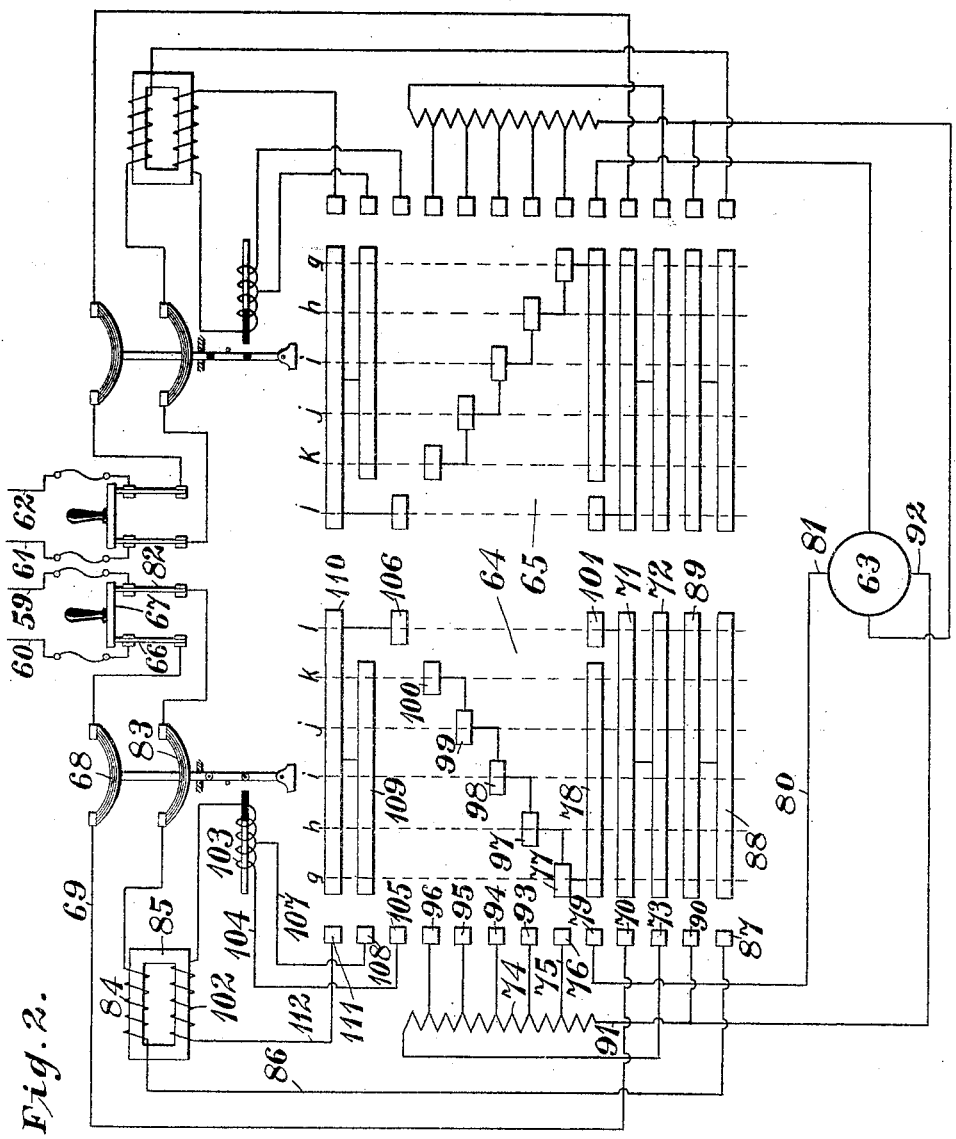

Figures 1 and 2 are diagrammatic views of systems constructed in accordance therewith which employ fuses and automatic circuit-breakers as means of protection.

Referring particularly to Fig. 1, polyphase alternating current energy is supplied from line conductors 1 2 and 3 4 to a two-phase motor 5 through a controller 6, which has a plurality of starting positions $a$, $b$, $c$, $d$, and $e$ and one running position $f$, so arranged that the electromotive forces of the two phases are varied in unison.

Considering first phase X, that is supplied by conductors 1 2, connections are completed, when the controller 6 is in position $a$, from conductor 1, through the blade 7 of a main-line switch 8, conductors 9 and 10, contact-finger 11, contact-ring segment 12, contact-ring segment 13, and contact-finger 14, to one terminal 15 of an autotransformer 16, which regulates the voltage of phase X that is applied to the motor 5. From the tap 17 on the autotransformer 16 connection is completed through contact-finger $17^a$, contact-ring segments 18 and 19, and finger 20 to one terminal 21 of the motor 5. The other terminal 22 of the motor 5 pertaining to phase X is connected, through conductors 23 and 24, finger 25, ring-segments 26 and 27, finger 28, conductors 29 and 30 and blade $30^a$ of the switch 8, to the line conductor 2.

When the controller 6 is moved from the position $a$ to position $b$, connection is similarly made through another tap 31, finger $31^a$, and ring-segment $31^b$, thereby increasing the voltage applied to the motor 5. The voltage is similarly increased as the controller passes through positions $c$, $d$, and $e$, since current flows successively from the taps 32, 33, and 34 of the autotransformer 16 through fingers 35, 36, and 37 and ring-segments 38, 39, and 40 to the ring-segment 19 without any other change in the circuit connections; but as the controller passes from the position $e$ to the position $f$ current from line conductor 1 passes through conductor 41 instead of through the conductor 10, since the finger 11 no longer engages with the ring-segment 12 and finger 42 engages ring-segment 43 and completes connection from the conductor 41, through the finger 42, ring-segment 43, ring-segment 44, finger 20, and conductor 45, to terminal 21 of the motor 5, which connection throws the full-line voltage on the motor, but causes the current to flow through the conductor 41, which was not used in the starting positions $a$, $b$, $c$, $d$, and $e$. At the same time connections are completed from the terminal 22 of the motor 5, through conductors 23 and 24, finger 25, ring-segment 26, ring-segment 46, finger 47, conductor 48, and conductor 30, to line-terminal 2, conductor 48 being used for this position instead of conductor 29, which was used for the starting positions $a$, $b$, $c$, $d$, and $e$, so that by inserting a suitable cut-out device—such, for example, as a fuse 49—in the path 41 and a similar device 50 in the path 48 the motor 5 may be protected to suit running conditions without preventing the use of heavy starting-currents, which may be limited by equipping the main line 1 2 with proper cut-out devices 1ª and 2ª to suit starting conditions.

The conductors 3 4 supply alternating current of phase Y to the motor 5, which is regulated in an exactly similar manner to that employed for phase X and hereinbefore described. In connection with phase Y a switch 51 corresponds to the switch 8 for phase X, an autotransformer 52 corresponds to the transformer 16, and a plurality of conductors 53, 54, 55, and 56 to the conductors 29, 48, 10, and 41, respectively. The conductors 54 and 56 are provided with cut-out devices 57 and 58, which may be respectively similar to the cut-out devices 50 and 49 that pertain to phase X, and the line conductors 3 and 4 may also be provided with cut-out devices 3ª and 4ª.

In the system illustrated in Fig. 2 two-phase alternating currents are supplied from line conductors 59 and 60 and 61 and 62 to a two-phase motor 63 through control-drums 64 and 65, respectively. When the drum 64 is in position $g$, line conductor 60 is connected through blade 66 of a line-switch 67, a circuit-breaker 68, conductor 69, finger 70, ring-segment 71, ring-segment 72, finger 73, tap 75 of an autotransformer 74, finger 76, ring-segment 77, ring-segment 78, finger 79, and conductor 80 to one terminal 81 of the motor 63. The line conductor 59 is connected through blade 82 of the switch 67, a circuit-breaker 83, the coil 84 of a series transformer 85, conductor 86, finger 87, ring-segment 88, ring-segment 89, finger 90, which is connected to one terminal 91 of the transformer 74, and terminal 92 of the motor 63. As the controller-drum 64 is moved from the position $g$ successively to the positions $h$, $i$, $j$, and $k$ the connections are similarly completed to the motor 63, except that fingers 93, 94, 95, and 96 rest, respectively and consecutively, on ring-segments 97, 98, 99, and 100. The fingers 93, 94, 95, and 96 are each tapped into the autotransformer 74, so that the voltage applied to the motor 63 is gradually increased as the drum 64 is moved successively to the positions $h$, $i$, $j$, and $k$. As drum 64 is moved from position $k$ to position $l$ connection is completed from the ring-segment 71 to the finger 79 through a ring-segment 101, so that full-line voltage is applied to the motor 63. The secondary winding 102 of the series transformer 85 is connected to a tripping-coil 103, which trips the circuit-breakers 68 and 83 when its ampere-turns reach a predetermined limit. The coil 103 is furnished with a terminal conductor 104, which is connected to a finger 105 of the controller that engages a ring-segment 106 only when the controller is in the running position $l$. Another conductor 107 is tapped into the coil 103 intermediate its ends and is connected to a finger 108, which rests on a ring-segment 109 when controller 64 is in the starting positions $g$, $h$, $i$, $j$, and $k$. The ring-segments 106 and 109 are connected to a ring-segment 110, which engages a finger 111 for all positions of the drum 64, the said finger being connected to one terminal 112 of the secondary coil 102 of the transformer 85, so that when the controller 64 is in any of its starting positions circuit is completed through only part of the turns of the coil 103, but when in its running position a circuit is completed through the whole of coil 103.

By adjusting the number of turns in each part of the coil 103 a relatively heavy current may be permitted to flow under starting conditions without tripping the circuit-breakers, while a lesser current, if too heavy for normal running conditions, will serve to trip the breakers.

The control systems hereinbefore described may be operated in connection with any convenient form of controller, the two forms specifically illustrated being shown merely as examples that are suitable for the service, and any operative form of cut-out device may also be employed.

I claim as my invention—

1. The combination with a dynamo-electric machine and means for varying the voltage applied thereto, of mutually-independent protective means, one of which is operative only when full voltage is applied to said machine.

2. The combination with a translating device and a controller therefor, of a plurality of protective devices, arranged to independently protect said translating device when said controller occupies different predetermined positions.

3. The combination with a translating device and a controller therefor, of two sets of protective devices, one of said sets being in service while said controller occupies certain predetermined positions and the other set being in service when said controller occupies certain other predetermined positions.

4. The combination with a translating device and a controller therefor, of protective means that are operative under predetermined values of energy supplied to said translating device when said controller occupies certain positions and that are operative under different values of energy supplied thereto when said controller occupies certain other predetermined positions.

5. The combination with a translating device and a controller for varying the voltage applied thereto, of a protective device that is operative only while said controller is maintained in position to supply full voltage to the translating device.

6. The combination with an electric motor and a controller therefor, of a set of protective devices that are operatively included in the supply-circuit of said motor only while said controller is maintained in a predetermined position.

7. The combination with a dynamo-electric machine and a controller therefor, of cut-out devices that are operatively connected in service only while said controller is maintained in a certain predetermined position corresponding to normal operation of said machine.

8. The combination with an electric motor and a controller therefor, of two sets of cut-out devices that are arranged to independently and properly protect said motor under starting conditions and under running conditions, as determined by the position of said controller.

9. The combination with an electric motor and means for varying the voltage applied thereto, of a plurality of cut-out devices that are included in the circuit of said motor only when full voltage is applied thereto.

10. The combination with an electric motor and means for varying the voltage applied thereto, of two sets of cut-out devices, one of which is included in the circuit of said motor only when full voltage is applied thereto and one of which is continuously in the circuit of said motor.

11. The combination with an electric motor and a controller therefor, of a plurality of cut-out devices that are arranged to properly protect said motor when said controller occupies a predetermined running position and that are excluded from the circuit of said motor when the said controller occupies one or more predetermined starting positions.

12. The combination with a dynamo-electric machine and a controller therefor, of a circuit-breaker in the supply-circuit of said motor, and a subdivided tripping-coil therefor all the turns of which are energized when said controller occupies certain predetermined positions and a part only of which are energized when said controller occupies certain other positions.

13. The combination of an electric motor and a controller therefor, of a circuit-breaker and means for tripping the same that are operative at one current value when said controller occupies predetermined "starting" positions and that are operative at another predetermined current value when said controller occupies a "running" position.

14. The combination with a dynamo-electric machine and means for varying the voltage applied thereto, of a circuit-breaker and tripping means therefor that are operative at different current values when full voltage is applied to said motor and when other than full voltage is applied thereto.

15. The combination of an electric motor and a controller therefor, of a circuit-breaker and a magnetizing-winding comprising a subdivided tripping-coil all the turns of which are connected in the circuit of said motor when said controller occupies a predetermined running position and a part only of which are connected in said motor-circuit when the controller occupies any one of a plurality of predetermined starting positions.

In testimony whereof I have hereunto subscribed my name this 31st day of March, 1905.

HENRY D. JAMES.

Witnesses:
 Ross W. COPELAND,
 BIRNEY HINES.